US008494670B2

(12) United States Patent
McConaghy et al.

(10) Patent No.: US 8,494,670 B2
(45) Date of Patent: Jul. 23, 2013

(54) MONTE-CARLO BASED ACCURATE CORNER EXTRACTION

(75) Inventors: Trent Lorne McConaghy, Vancouver (CA); Jeffrey Dyck, Saskatoon (CA); Jiandong Ge, Saskatoon (CA)

(73) Assignee: Solido Design Automation Inc., Saskatoon, Saskatchewan (CA)

(*) Notice: Subject to any disclaimer, the term of this patent is extended or adjusted under 35 U.S.C. 154(b) by 322 days.

(21) Appl. No.: 13/081,030

(22) Filed: Apr. 6, 2011

(65) Prior Publication Data

US 2012/0259446 A1    Oct. 11, 2012

(51) Int. Cl.
*G06F 17/50* (2006.01)
*G06F 9/455* (2006.01)

(52) U.S. Cl.
USPC ............. 700/104; 703/14; 716/106; 716/132

(58) Field of Classification Search
USPC ............................................. 700/104
See application file for complete search history.

(56) References Cited

U.S. PATENT DOCUMENTS

| | | | | |
|---|---|---|---|---|
| 7,716,023 | B2* | 5/2010 | Barker et al. | 703/14 |
| 2008/0059143 | A1* | 3/2008 | Chiu et al. | 703/14 |
| 2009/0216359 | A1* | 8/2009 | McConaghy et al. | 700/103 |
| 2009/0228846 | A1* | 9/2009 | McConaghy et al. | 716/4 |

* cited by examiner

*Primary Examiner* — Kavita Padmanabhan
*Assistant Examiner* — Steven Garland
(74) *Attorney, Agent, or Firm* — Louis B. Allard; Borden Ladner Gervais LLP

(57) ABSTRACT

For application to analog, mixed-signal, and custom digital circuits, a system and method to extract circuit-specific process/environmental corners that is yield-aware and/or specification-aware. Simulation data from previous Monte Carlo-based verification actions can be re-used.

15 Claims, 15 Drawing Sheets

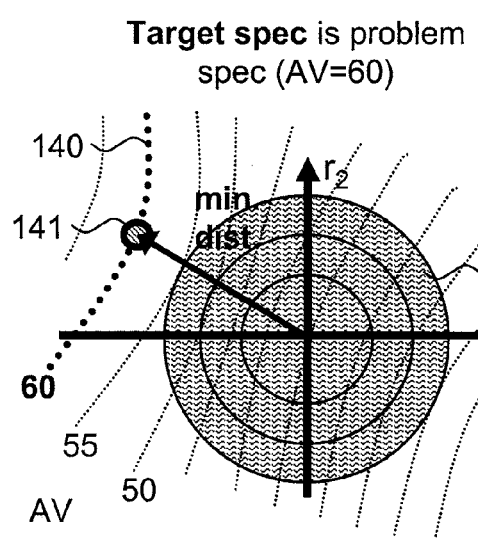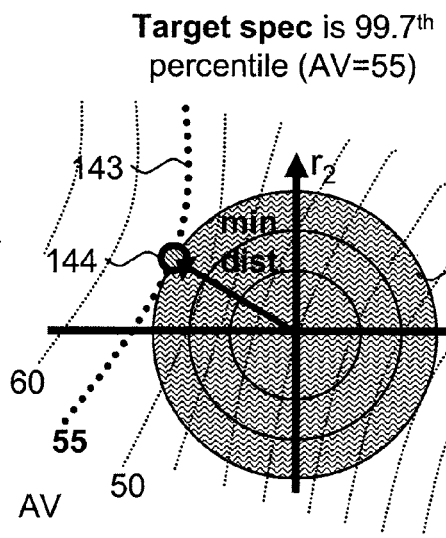
FIGURE 8A  FIGURE 8B

US 8,494,670 B2

MONTE-CARLO BASED ACCURATE CORNER EXTRACTION

FIELD

The present disclosure relates generally to analog, mixed-signal, memory, and custom digital electrical circuit designs (ECDs). More particularly, the present disclosure relates to design tools used to improve the performance or yield of such circuits.

BACKGROUND

Software tools are frequently used in the design of analog, mixed-signal, memory, and custom digital circuits. These are called computer-aided design (CAD) tools. In front-end design-for-yield, designers typically choose the sizes of the devices that are part of the electrical circuit, such that the maximum possible percentage of manufactured chips meet all specifications such as, e.g., gain >60 dB and a power consumption <1 mW. As such, the designers strive to maximize the overall yield or performance specifications of ECDs. An ECD design point has values for each design variable, design variables typically comprising widths and lengths for each device, resistances for resistors, and capacitances for capacitors, etc.

When choosing values for a design point, the designer must consider the effect of global process variations, local process variations, and environmental variations on the ECD. Environmental variables can include temperature and load conditions. All these effects can be simulated simultaneously in any suitable electronic circuit simulator such as, for example, a Simulation Program with Integrated Circuit Emphasis (SPICE) software.

Monte Carlo sampling is a simple and commonly-used approach to estimate overall yield of a design. In Monte-Carlo sampling, several (e.g. 50) process points are drawn from a distribution of global or local process variables, which characterize device level process variations. For each Monte-Carlo sample (a process point), one or several environmental points are simulated. A sample (process point) is feasible if it meets all performance specifications on all environmental points. Overall yield is the percentage of Monte Carlo samples that are feasible on all specifications. Similarly, Monte Carlo sampling can be used to estimate the partial yield of a design. Partial yield for a given output performance metric is the percentage of Monte Carlo samples that are feasible on the specifications for just that output performance metric.

One simple yield-aware approach for designing electrical circuits involves using Monte-Carlo sampling of the process space directly in the design loop. That is, for every candidate design, Monte-Carlo sampling is invoked to estimate the yield of the candidate design. Unfortunately, a single circuit simulation can take 1 minute or more, which means that a Monte-Carlo sampling run can easily take more than an hour. For this reason, for many circuits of interest, it is impractical to use Monte-Carlo sampling directly within a design loop (device sizing loop), whether it be a manual or an automatic design loop. Instead, Monte-Carlo sampling is typically performed late in the front-end design process, as a verification step.

"Uncontrollable" variables are variables which affect the design's performance or yield but cannot be controlled by the designer the way that design variables can be controlled. Process variables and environmental variables are uncontrollable variables. To perform yield-aware design of electrical circuits, designers often try to simplify their design problem via "corners", a corner being a point in the space defined by the uncontrollable variables (process variables and the environmental variables). The core idea of corners-based approaches is if corners are representative of possible process and environmental variations, then achieving satisfactory performance on the corners leads to satisfactory performance and yield with respect to all possible variations. In such corner-based methods, there are typically just a few corners. Therefore, designers can quickly simulate all corners, enabling rapid design iterations against these corners. A second benefit is that corners can be used in CAD tools that do not support probability distributions, such as traditional digital timing analysis tools.

There may be other uncontrollable variables in front-end design too, such as those related to electrical circuit parasitics, aging, or layout-dependent effects. Without loss of generality, the present disclosure does not consider these variables which can typically be treated similarly to process and/or process variations.

In corner-based design of electrical circuits, a key challenge is finding corners that are representative for the ECD. That is, the challenge lies in capturing the variation bounds of the electrical circuit's performance. If the corners are not representative, then designing with them will lead to inferior electrical circuits that do not meet targets for performance or yield.

In the prior art, there are several methodologies to extract corners, and to design electrical circuits at the corners. Examples of such prior art methodologies follow.

FIG. 1 shows the most standard traditional prior art flow for corner-based design of electrical circuits. The flow of FIG. 1 can be referred to as a Process Voltage Temperature (PVT) Foundry flow. At the outset, the present flow is for an electrical circuit that has an initial set of design variables, that can be varied in order for the electrical circuit to meet certain targets. The flow starts at 101 and takes as input foundry-supplied global process corners 102 to capture global process variations. An example of such global process corners can be drawn from CMOS device models having their global process variables set to model an NMOS component, which can have fast, slow, or typical behaviors, and a PMOS component, which can also have fast, slow, or typical behaviors. The CMOS device can then be analyzed, for example, at the Fast-NMOS/Fast-PMOS (FF), Fast-NMOS/Slow-PMOS (FS), Slow-NMOS/Fast-PMOS (SF), Slow-NMOS/Slow-PMOS (SS), or Typical-NMOS/Typical-PMOS (TT) global process corners. These global process corners are designed to bracket a digital circuits' key performance characteristics of speed and power. Given the global process corners 102, the user will create PVT corners. Each PVT corner consists of a global process corner along with an environmental point. The next action is for the user to improve, at reference numeral 104 the design of the electrical circuit against the global process corners 102 by modifying the values of design variables from their initial values. The aim of action 104 is to choose design variable values such that the worst-case performances across all PVT corners are optimized, or at least such that worst-case performances meet target performance metrics (if provided at action 103).

The design at action 104 can involve changing design variables of the ECD. Feedback on an ECD's performance metrics is typically obtained via a SPICE software application or, sometimes, equations or response surface models. For each performance metric, an ECD's overall output performance is established as the worst-case performance metrics across all global process corners. Action 104 may be performed manually, or automatically (e.g., with an optimizer), or with a mix of manual design and automatic design. If the ECD's target performance metrics are known and input at action 103, then the goal of action 104 will be to change the ECD variables such that all target performance metrics are met. If the target performance metrics are not input, then the user (designer) can choose a design that has a reasonable tradeoff among circuit performances.

At action 105, the user may choose to run a Monte-Carlo sampling, to identify the overall yield of the ECD obtained at action 104. The strengths of the flow shown at FIG. 1 include designer familiarity, and simplicity because the designer does not need to determine specific corners for each new circuit design. However, this approach has several problems. First, the global process corners used in action 104 do not bracket performance characteristics other than speed and power. This is a problem in digital circuit design, and an even bigger problem in analog, radio frequency (RF), and memory design where speed and power are typically not the most important performance characteristics (metrics). Second, it ignores local process variation, which may have major effect on overall yield. Also, there is no reliable means for the user to choose environmental values to cause worst-case performance. Finally, the approach does not provide a means to design against a particular target yield.

FIG. 2 shows another prior art flow, which can be referred to as a PVT Design-specific flow. This flow starts at action 101'. At the outset, the present flow is for an electrical circuit that has an initial set of design variables, that can be varied in order for the electrical circuit to meet certain targets. As in the PVT Foundry flow of FIG. 1, it inputs FF/SS global process corners 106 and optionally inputs target performance metrics 107. But whereas the PVT Foundry flow leaves it to the user to determine environmental values at different FF/SS global process corners, the flow of FIG. 2 automatically determines, at action 108, combinations of global process corners and environmental values that bracket performances. The action 108 can be performed in several ways. A simple way is to enumerate all possible combinations of global process corners and environmental values, simulate them all (typically 50-1000 simulations), and pick the simulated corners causing worst-case performance of the electrical circuit being designed. The actions of design 109 and Monte-Carlo sampling 110 are like actions 104 and 105 of the PVT Foundry flow of FIG. 1. The flow of FIG. 2 brackets all performance characteristics, and gives a reliable means to choose environmental values to cause worst-case performance. However, the present flow ignores local process variation and does not provide a means to design against a particular target yield.

FIG. 3 shows another prior art flow which can be referred to as Statistical linear-RSM (Response Surface Modeling) flow (for example, see: Frank Schenkel, Michael Pronath, Stephan Zizala, Robert Schwencker, Helmut E. Graeb, Kurt Antreich, "Mismatch Analysis and Direct Yield Optimization by Spec-Wise Linearization and Feasibility-Guided Search," in Proceedings Design Automation Conference, 2001, pp. 858-863). At the outset, the present flow, as in the prior art flows of FIGS. 1 and 2, is for an electrical circuit that has an initial set of design variables, that can be varied in order for the electrical circuit to meet certain targets. The flow of FIG. 3 begins at 111 and inputs the ECD's target performance metrics at action 112. The flow then performs action 113 to 117 in an iterative loop. At action 113, each input variable (global process variable, local process variable, environmental variable, and, optionally, design variable) is perturbed by a small amount to obtain perturbation points, and, the ECD is simulated at the perturbation points. Additionally, the nominal point is simulated. Action 114 takes the simulation results to construct a linear model for each performance metric of the ECD, mapping the input variables to each performance metric. Action 115 determines the process/environmental corners at which each linear model is likely infeasible, that is, determines process/environmental points at which each linear model likely fails to meet its respective target performance metric. In typical cases, there is one target performance metric for each performance, either an upper bound or a lower bound, and therefore one corner for that performance. (In some cases there are both upper and lower bounds, and therefore two corners for that performance. Without loss of generality, only one corner per performance metric can considered in the present example. The actions of design 116 and Monte-Carlo sampling 117 are like actions 104 and 105 of the PVT Foundry flow of FIG. 1. If the user is satisfied with the yield or performance 118, the design loop terminates; otherwise it repeats.

As a strength, the flow of FIG. 3 considers global process, local process, and environmental variations. Its main weakness is the assumption of a linear mapping from process and environmental variables to performance, which is very often not true, especially in modern process geometries (e.g., 45 nm features on electrical circuits). This assumption may cause the corners extracted at 115 to be far from the feasibility boundary, and therefore, the iterative design process may not converge to good designs. Also, this approach assumes that target performance metrics are provided; it does not provide a means to explore tradeoffs among problem specifications at a target yield.

FIG. 4 shows another prior art flow which can be refereed to as: "Statistical Optimal-Worst-Case" (for example, see Emil S. Ochotta, Tamal Mukherjee, Rob A. Rutenbar, L. Richard Carley, Practical Synthesis of High-Performance Analog Circuits, Kluwer Academic Publishers, Boston, Mass., 1998, ISBN 0792382374). At the outset, the present flow, as in the prior art flows described above, is for an electrical circuit that has an initial set of design variables, that can be varied in order for the electrical circuit to meet certain targets. The flow starts at 119. Optionally, target performance metrics can be provided at 120. Action 121 performs the corner extraction. Specifically, for each performance metric, action 121 finds a corner that causes the worst-case performance in a space bounded by a hypercube. The hypercube has one dimension for each global or local process variation, with minimum/maximum variations of +/-"n" standard deviations (e.g., n=3). The hypercube also has one dimension for each environmental variable. Search in this hypercube can be conducted with an optimization algorithm, or by full enumeration if the dimensionality of the hypercube is low. The actions of design 122 and Monte-Carlo sampling 123 are like actions 104 and 105 of the PVT Foundry flow of FIG. 1. The flow ends at 124 if the ECD meets the termination criteria (e.g., target performance metrics).

The main weakness of the flow of FIG. 4 is that it returns highly pessimistic corners. That is, by searching across a hypercube in process variable space, the corners of the hypercube can be very improbable (especially if there is a large number of process variables), leading to causes of failure that will likely never exist in practice. It may be very difficult to even design circuits that meet these corners, and by doing so they may trade off other more important goals. A second weakness of this flow is that, for the case when target performance metrics are given, the extracted corners obtained at action 121 do not have any direct relationship to yield.

FIG. 5 shows another prior art flow which can be referred to as a "Statistical Monte-Carlo-Worst-Case" flow. Whereas the Statistical Optimal-Worst-Case flow of FIG. 4 found worst-case corners using optimization, the flow of FIG. 5 finds worst-case corners using Monte-Carlo sampling. The benefit of this is that the same Monte-Carlo simulation data that is used for verification can be used for extracting corners. At the outset, the present flow, as in the above prior art flows, is for an electrical circuit that has an initial set of design variables (design point), that can be varied in order for the electrical circuit to meet certain targets. The flow starts at 126. Monte Carlo sampling (like 105 of PVT Foundry flow) is performed at 127. This can be termed the "verification" step. At action 128, If the ECD has adequate yield and performance, it can stop 129. Otherwise, the flow proceeds to action 130. For each performance metric, a Monte-Carlo sampled process point and an environmental point that causes the worst-case performance is selected as a corner. (Worst case is the minimum or maximum value of the performance metric, depending on the metric; for example, worst-case value for power would be maximum power. For some performance metrics, both the minimum and maximum are taken, giving two worst-case performances and two worst-case corners for that performance metric.) At action 131, the electrical circuit is designed against the corners (e.g., by modifying design variables in the ECD). The sequence of actions 127-131 until action 128 is satisfied. At each iterative loop, previous corners are typically kept as well, to prevent non-convergence. The key strength of this approach is the reuse of verification Monte-Carlo data for corner extraction. This can reduce the number of simulations required. As a further advantage, the extracted corners of the present flow are not necessarily pessimistic. The main weakness of the flow of FIG. 5 is that there is no relation between extracted corners and any pre-determined target yield or target performance metrics. Also, the present flow will likely take several iterations to hit the target yield. Combined with keeping corners from previous iterations, the design action 131 will slow down considerably in later iterations.

Therefore, improvements in corner extraction and design of electrical circuits at the extracted corners are desirable.

SUMMARY

In a first aspect, the present disclosure provides a method to size an electrical circuit design (ECD). The ECD has associated thereto design variables, process variables and environmental variables. The process variables define a process variables space that has a distribution of process points, and the environmental variables define an environmental variables space defined by environmental points. The ECD has associated thereto a design point defined by a set of design variable values. The ECD further has associated thereto a plurality of performance metrics. The method comprises: (A) iteratively performing actions a-d until a pre-determined overall stop criteria has been attained: a) drawing an initial set of process points from the distribution of process points; b) for each process point, automatically simulating the ECD, at the design point, on all the environmental points, to obtain simulation performance data; c) determining, in accordance with the performance data, if the pre-determined overall stop criteria has been attained; d) if the overall stop criteria has not been attained, iteratively performing the following actions i-v until a corner performance-based stop criteria has been attained: i) in accordance with the initial set of process points, the environmental points, and the performance data, determining a set of corner points, each corner point having a process point and environmental point; ii) defining the corner performance-based criteria in accordance with at least one of the overall stop criteria and the set of corner points; iii) varying at least one design variable value to modify the design point; iv) simulating the design point at the corner points, to obtain additional simulation performance data; and v) determining, in accordance with the additional simulation performance data, if the corner performance-based stop criteria has been attained; and, (B) storing the design point in a tangible, non-transitory computer readable medium.

Drawing the initial set of process points from the distribution of process points can include drawing points using pseudo-random sampling. Drawing the initial set of process points from the distribution of process points can include drawing points using low-discrepancy sampling.

The overall stop criteria can include target performance metric values. Determining the set of corner points can include determining, for each target performance metric value, a process point from the initial set of process points at which a worst-case performance metric value of the process point is closest to its respective target performance metric value, the worst-case performance metric value being determined subsequent a simulation of all environmental points at the process point; and defining the corner performance-based stop criteria can include setting the corner performance-based stop criteria to include the target performance metric values. Determining the set of corner points can further include performing, for each performance metric, a one-dimensional line search on a line that includes a nominal process point and the process point having the worst-case performance metric value that is closest to the respective target performance metric value, the one-dimensional line search to obtain a process point at which the worst-case metric value is nearer to the target performance metric value than the process point at which the worst-case metric value is closest to the target performance metric value.

Performing the one-dimensional line search can include simulating the ECD at process points comprised on the line to obtain line search simulation data, the line search simulation data to calculate worst-case performance metric values for the sample points comprised on the line.

Determining the set of corner points can further include, for each performance metric: performing a perturbation of the process point having the worst-case performance metric value that is closest to the respective target performance metric value, and of the environmental point associated with the worst-case performance metric value, to obtain perturbation points; simulating the ECD at the perturbation points to obtain perturbation simulation data; calculating, in accordance with the perturbation simulation data, a perturbation performance metric value for each perturbation point to obtain perturbation performance metric data; determining, in accordance with the perturbation performance metric data, a linear model of the performance metric; and determining, in accordance with the linear model of the performance metric, a process point at which the worst-case performance metric value is nearer to the target performance metric value than the process point at which the worst-case performance metric value is closest to the target performance metric.

The pre-determined overall stop criteria can include a target ECD yield. Determining the set of corner points can include: selecting process points from the process variables space to obtain selected process points, each selected process point having a probability density associated thereto; forming groups of selected process points; calculating an overall yield for each group; calculating, for each group, a product of the probability densities of the process points; and selecting, as the set of corner points, the group having an overall yield that is equal to, or greater than, the target ECD yield and that has the highest product of probability densities; and defining the corner performance-based criteria includes setting the corner performance-based stop criteria to include the target performance metric values.

The overall yield of each group can be calculated in accordance with the performance metric values of each point the group and in accordance with the performance metric values of process points the initial set of process points.

A calculation of an overall yield of each group can include: for each performance metric of each process point in the group, estimating or simulating the performance metric value; determining, in accordance with the estimated or simulated performance values, a proportion of the initial set of process points that are feasible.

Determining the set of corner points can include: forming groups of target performance specs, each group having one target spec for each performance metric associated with the ECD; calculating, in accordance with the initial set of process points, an overall yield for each group; calculating, for each of the target performance spec of each group, a partial yield of each target performance spec; calculating, for each group, a sum of the partial yields of each target performance spec; identifying a group that has a lowest sum of partial yields and an overall yield that is equal to, or greater than, the target ECD yield; and for each target spec of the identified group, selecting, from the process variables space, a process point that has a highest probability density subject to having a performance metric value within a pre-determined range of its respective target spec; and, defining the corner performance-based criteria includes setting the corner performance-based stop criteria to include the target performance metric values.

Selecting, from the process variables space, the process point that has a highest probability density, can include performing a one-dimensional line search on a line that includes a nominal process point and the process point that has a highest probability density, the one-dimensional line search to obtain a process point at which the performance metric value is nearer to the target spec than the process point with the highest probability density.

Determining the set of corner points can include: forming groups of target performance specs, each group having one target spec for each performance metric associated with the ECD; calculating, in accordance with the initial set of process points, an overall yield for each group; calculating, for each of the target performance spec of each group, a partial yield of each target performance spec; calculating, for each group, a sum of the partial yields of each target performance spec; identifying a group that has a lowest sum of partial yields and an overall yield that is equal to, or greater than, the target ECD yield; for each target spec of the identified group: selecting, from the process variables space, a process point that has a performance metric value closest to its respective target performance spec; and calculating an offset between the performance metric value of the process point and the respective target performance spec to obtain an offset-adjusted target performance spec; and, defining the corner performance-based criteria includes setting the corner performance-based stop criteria to include the offset-adjusted target performance metric values.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIGS. 8A and 8B show a comparison between specification-driven corner extraction yield-driven corner extraction.

DETAILED DESCRIPTION

The present disclosure provides a method to efficiently identify corner points (each corner point comprising a global process point, local process point, and environmental point) at which an electrical circuit can be designed such as to meet pre-determined criteria of yield and/or performance. That is, the corner points are such that if the design variables of the electrical circuit are optimized to have the electrical circuit meet pre-determined performance criteria at those identified corner points, then the electrical circuit will meet overall yield (or performance) criteria. The present disclosure also provides a method of designing the electrical circuit at the corner points. Corner points can also be simply referred to as corners.

Figure 6:
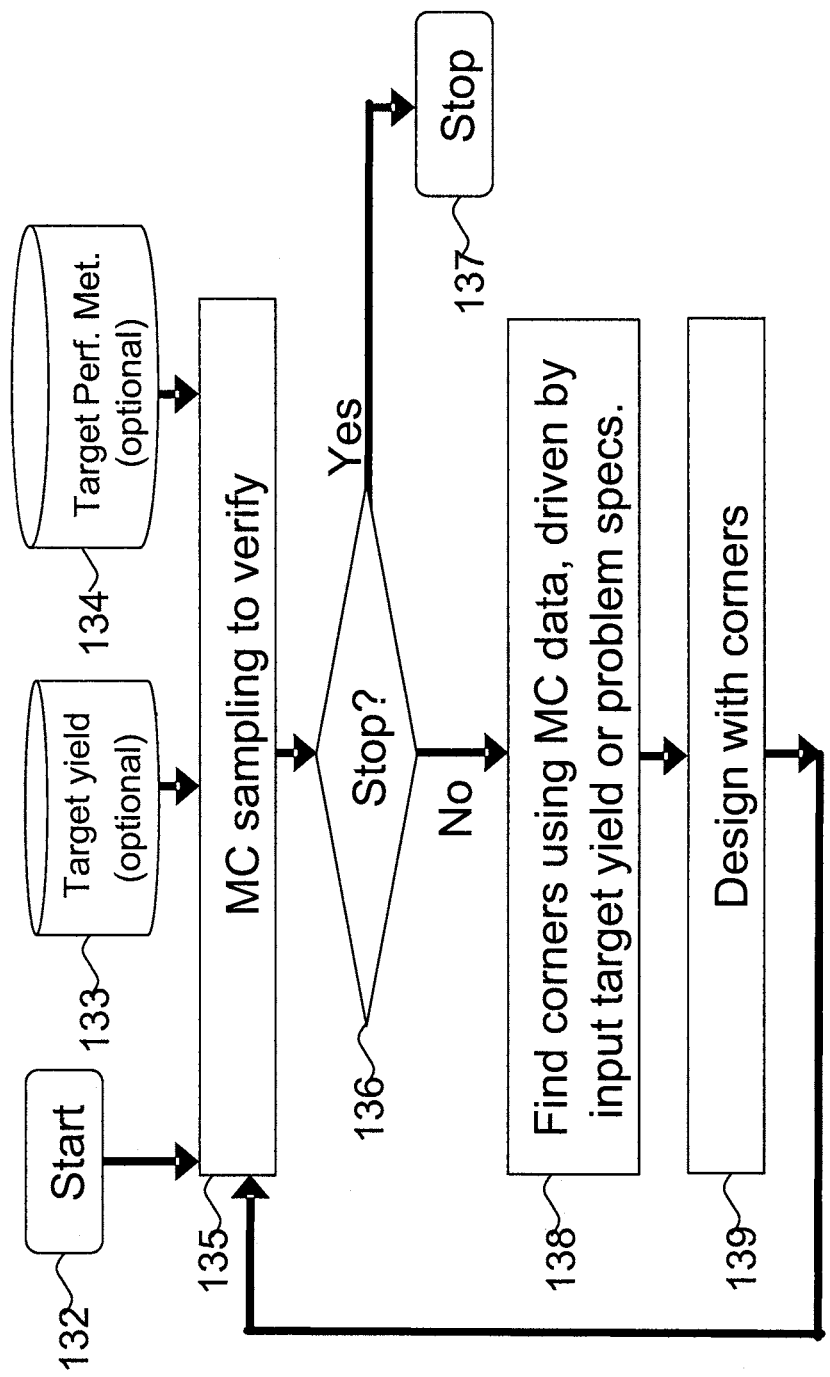
FIG. 6 shows a flowchart of a first embodiment of a method of the present disclosure.

An exemplary method of the present disclosure is shown in the flow of FIG. 6, which represent a method to change the design variables of an ECD that has an initial design point (initial set of design variables). The design point can be varied in order for the electrical circuit to meet certain targets. The flow of FIG. 6 begins at action 132 and can have as input a target yield 133 and target performance metrics 134 (which can be referred to as target performance metric values). First, Monte Carlo sampling of process points is performed at action 135, to obtain a set of initial process points. The initial ECD can be tested, at action 136, at all pre-specified environmental points for each process point in the initial set of process points. If it is determined, at action 136, that the initial ECD has satisfactory yield and performance, the flow exits at action 137. If not, then process/environmental corners are extracted at action 138. The extraction (or obtention) of the process/environmental corners can be made in accordance with the input target yield 133 and/or the input target performance metrics 134. At action 139, the ECD is improved by changing the design and getting feedback by simulating at the extracted corners obtained at action 138.

Figure 7:
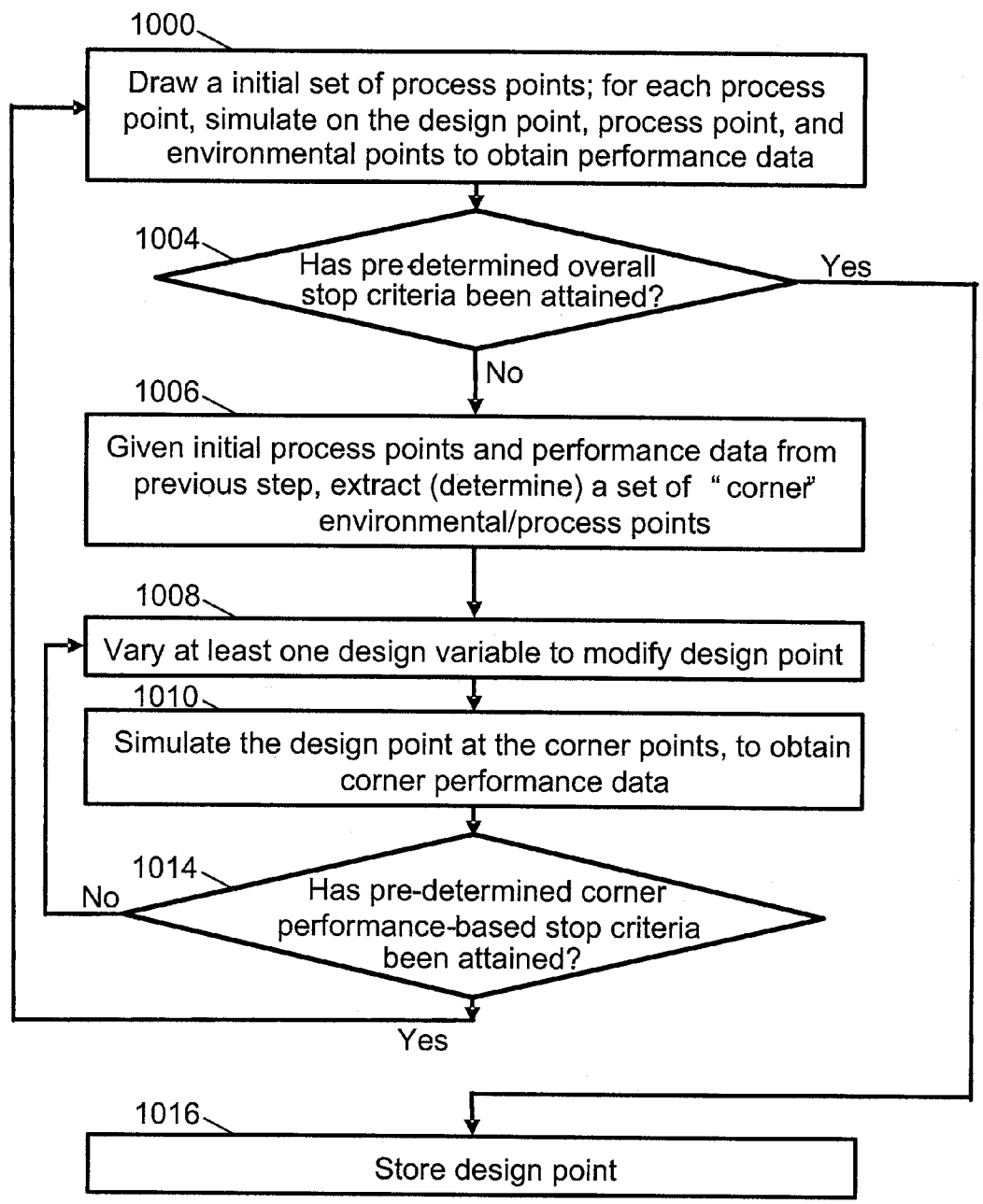
FIG. 7 shows a flowchart of another embodiment of a method of the present disclosure.

FIG. 7 shows another exemplary flow of the present disclosure. The flow of FIG. 7 represent a method to change the design variables of an ECD, that includes Monte Carlo sampling, corner extraction that uses the Monte Carlo simulation data, and design iterations that simulate on the extracted corners. The ECD has design variables, process variables and environmental variables associated thereto. The design variables define a design variable space, process variables define a process variables space and the environmental variables define an environmental variables space. A set of values for design variables is a design point; a set of values for process variables is a process point; and a set of values for environmental variables is an environmental point. The design variables may include transistor widths and lengths, resistor resistances, capacitor capacitances, and more. There is an initial design point. The process variables include global or local process variables. The process variables are characterized by a probability distribution. Environmental variables may include temperature, load capacitance, load resistance, and more. There is one or more user-specified environmental points. Additionally, the ECD has associated thereto a plurality of performance metrics. A performance metric is any measurable electrical circuit quantity. The performance metrics for an ECD will vary depending on the functionality of the ECD. As examples, performance metrics can include voltage gain, low frequency gain, unit gain frequency, phase margin, voltage offset, positive slew rate, negative slew rate, and any other suitable measurable electrical circuit quantity.

At action 1000, an initial set of process points is drawn (sampled) from the distribution of process points; for each process point, the ECD, at its initial design point, is automatically simulated (e.g., with a SPICE program) on the environmental points, to obtain simulation performance data; where the performance simulation data contains a performance metric value for each performance metric of the ECD at each combination of process point and environmental point. The drawing (sampling) of process points can be performed by drawing process points from a random distribution of the process variables in any suitable way such as, for example, by drawing points using pseudo-random sampling or by using low-discrepancy sampling. The drawing of process points can include Monte-Carlo sampling.

At action 1004, in accordance with the performance data, it is determined if a pre-determined overall stop criteria has been attained. The pre-determined overall stop criteria can include, for example, a target yield and/or target performance metric values. If the pre-determined overall stop criteria has been attained, then the procedure will go to action 1016, wherein the ECD design point is stored in a tangible, non-transitory computer-readable medium. The design point can ultimately be used to produce an electrical circuit based on the ECD. If in 1004 the stop criteria has not been attained, then the procedure continues to action 1006. In 1006, a set of "corner" environmental/process points are determined, in accordance with the set of initial process points and its corresponding simulation data at environmental points. Subsequently, the following actions 1008-1014 are performed until a pre-determined corner performance-based stop criteria has been attained. Examples of such corner performance-based stop criteria are provided elsewhere in the present disclosure. At 1008, at least one design variable of the set of design variables is varied, thereby modifying the design point. At 1010, the ECD is simulated, in accordance with the design point, at the set of corner process/environmental points, to obtain corner performance simulation data, where the corner performance simulation data contains a performance metric value for each performance metric of the ECD at each corner process/environmental point. At 1014, in accordance with the corner performance simulation data, it is determined if the pre-determined corner performance-based stop criteria has been attained. As such, actions 1008-1014 determine the design point that allows the ECD to attain the pre-determined corner performance-based stop criteria at the additional corner points determined at 1006. If the corner performance-based stop criteria has not been attained, then the procedure goes back to action 1008 for another design-changing iteration; otherwise, the procedure goes to action 1000 for another Monte Carlo verification.

Figure 1:
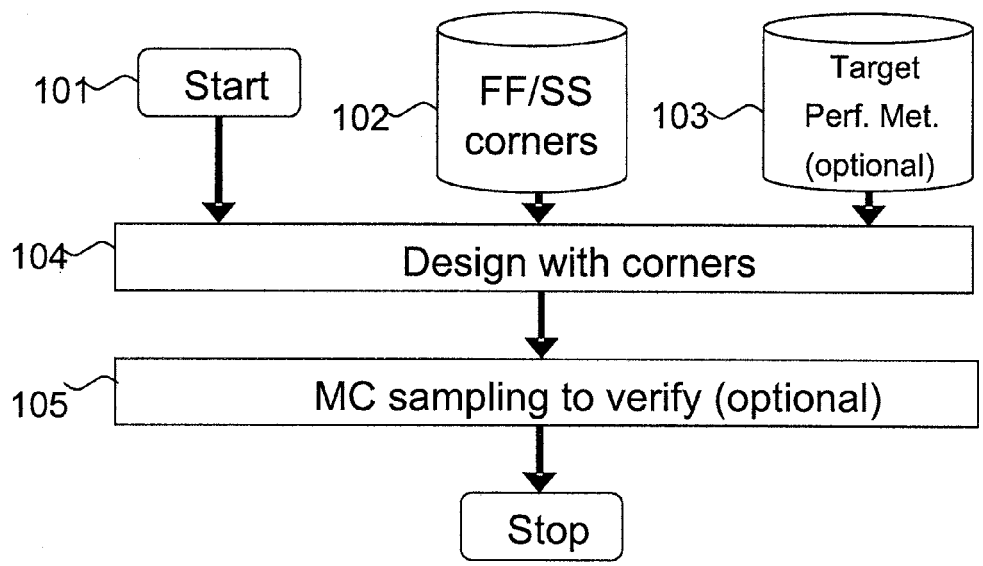
FIG. 1 shows a flowchart of the first prior art method.
Figure 2:
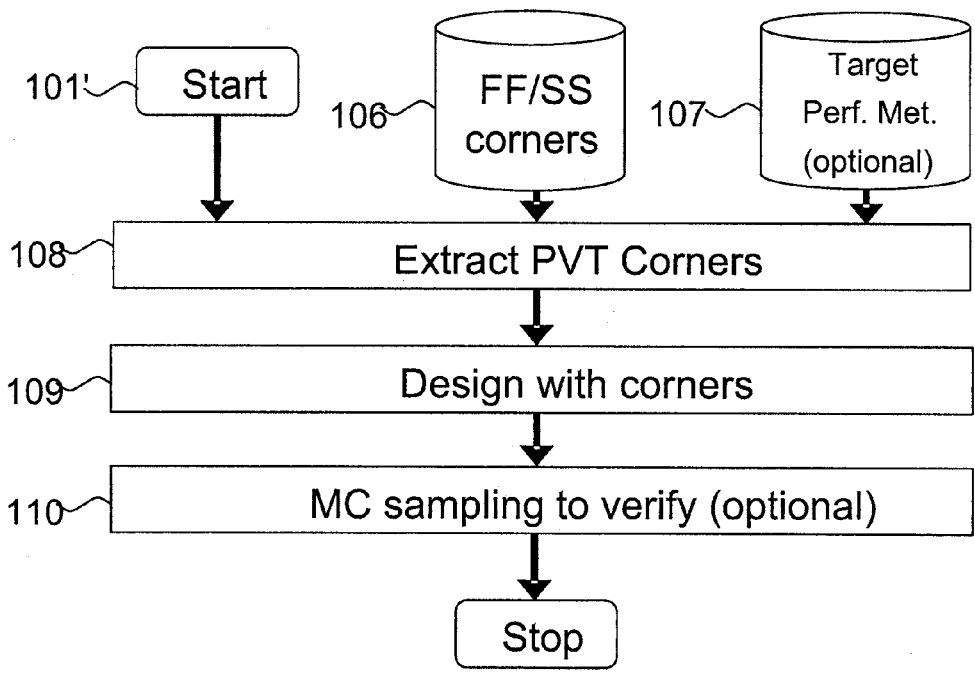
FIG. 2 shows a flowchart of the second prior art method.
Figure 3:
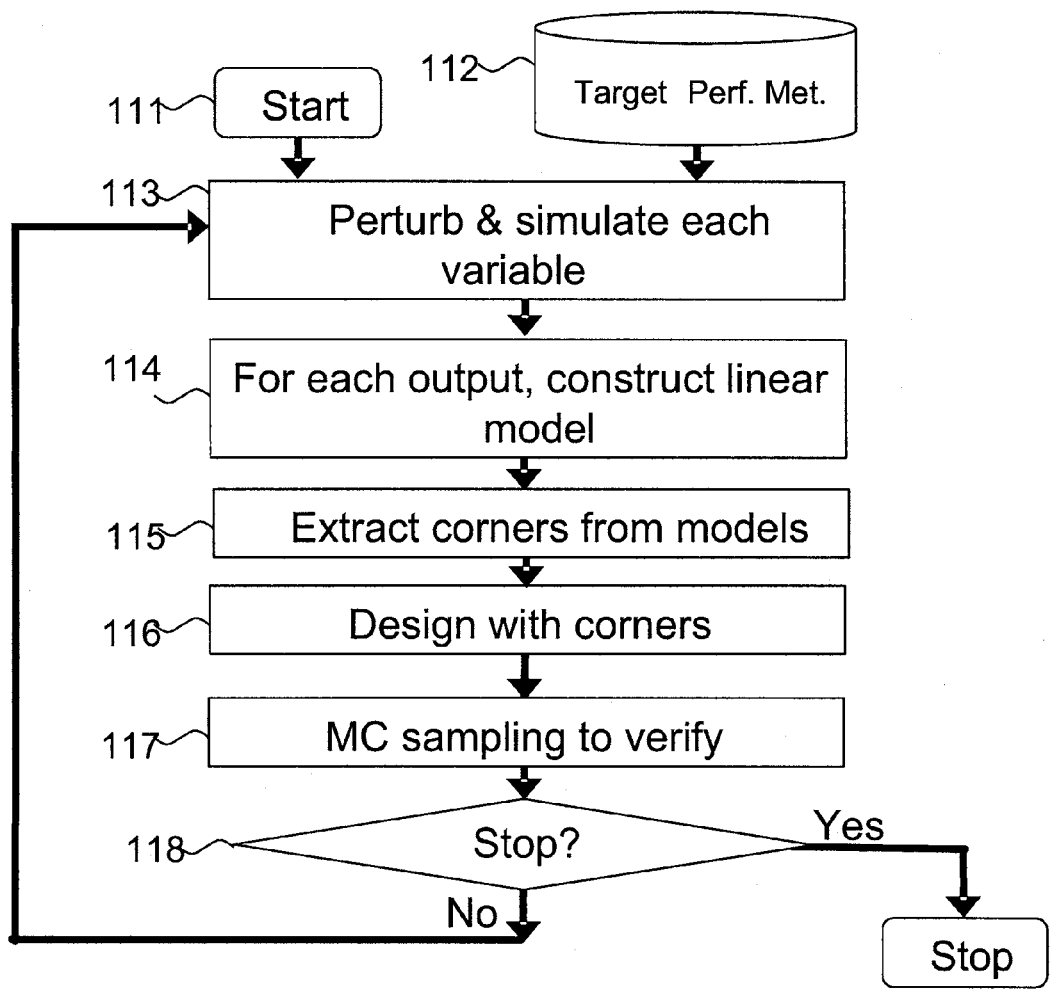
FIG. 3 shows a flowchart of the third prior art method.
Figure 4:
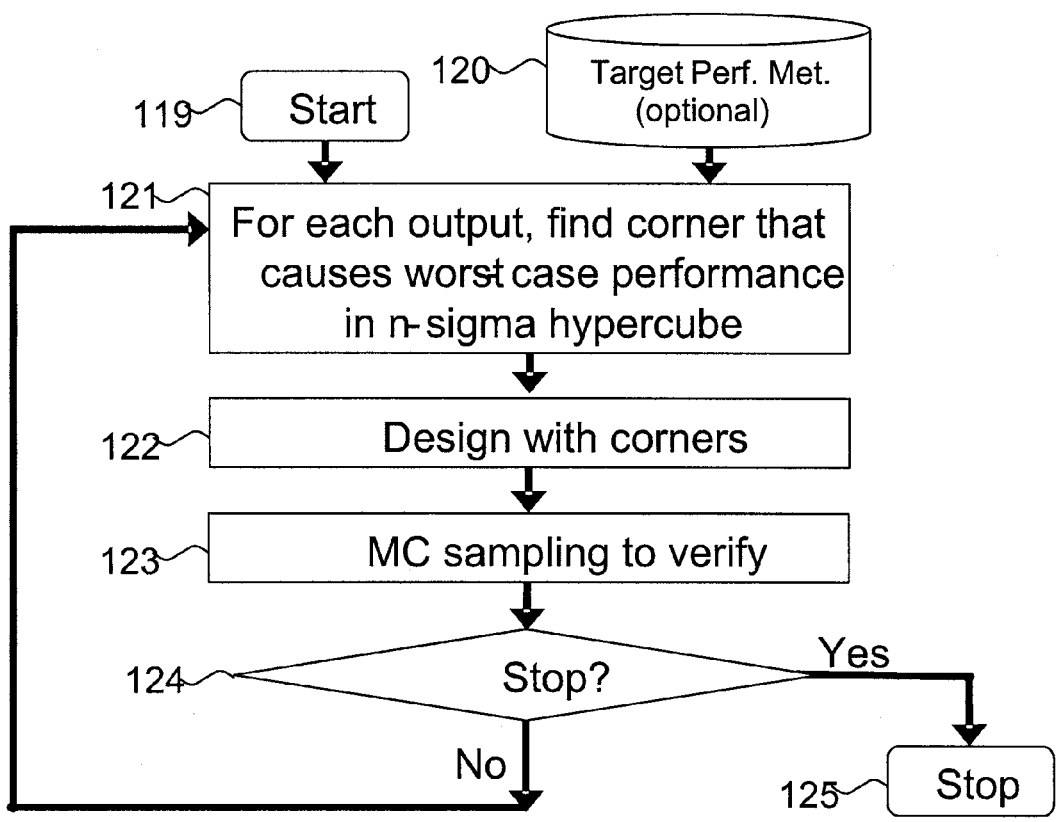
FIG. 4 shows a flowchart of the fourth prior art method.
Figure 5:
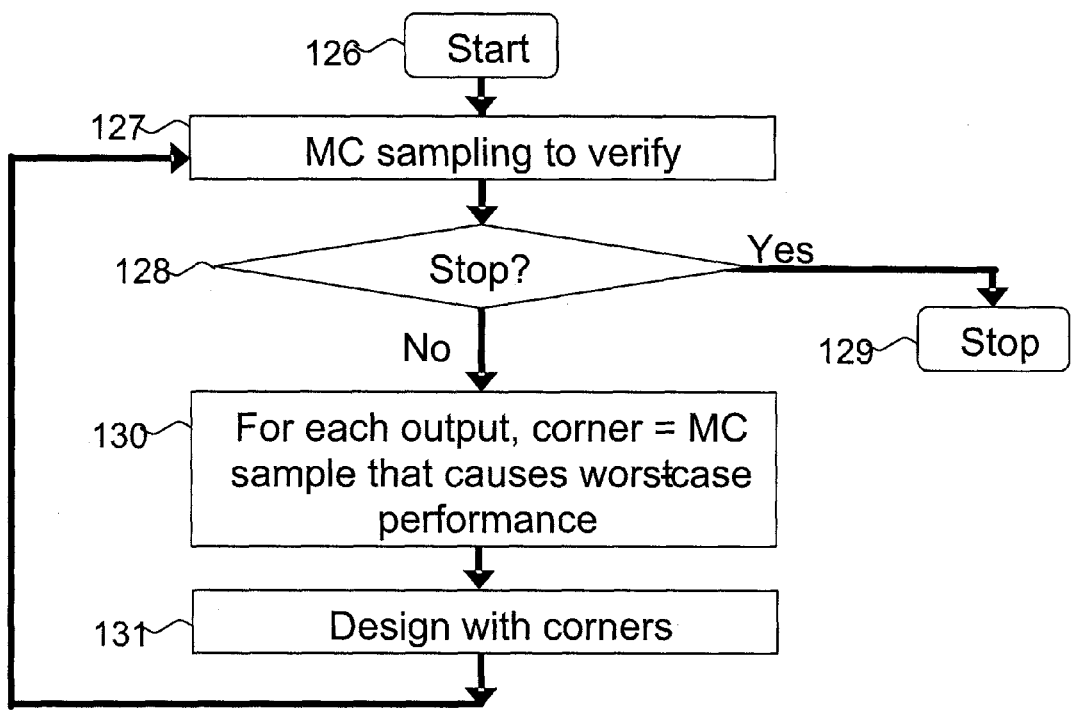
FIG. 5 shows a flowchart of the fifth prior art method.

In the examples of FIGS. 6 and 7, the flow can be yield-driven or performance-driven. That is, the flow can have its overall stop criteria depend on a target ECD yield or on target performance metric values. A "yield-driven" flow aims to improve performance specifications, subject to a pre-specified target yield (overall yield). A "specification-driven" flow aims to improve yield, subject to pre-specified target performance metric values. The only above-noted prior art flow that uses Monte-Carlo sample data for corner extraction is Statistical MC-worst-case (FIG. 5), which is not yield-driven or specification-driven, and therefore it is difficult for the user to know how corners relate to both yield and performance. In contrast, in the present disclosure, the flow and extracted corners of, for example, FIG. 6 can be yield-driven or specification-driven. That is, the pre-determined overall stop criteria can be a function of a target yield of the ECD or of target performance metrics of the ECD. Alternatively, the pre-determined overall stop criteria can be a function of a target yield of the ECD and of performance metrics of the ECD.

FIGS. 8A and 8B show the distinction between specification-driven and yield-driven corner extraction in an example involving two normally, identically, and independently distributed (NIID) process variables $r_1$ and $r_2$ that have a mean/nominal value of zero. In FIG. 8A, one-, two-, and three-sigma contours are shown at 142, the three-sigma contour being the outermost ring, the one-sigma contour being the innermost ring, and the two-sigma contour being the intermediary ring. For a given performance metric value, a specification-driven corner aims at the problem's target performance metrics (FIG. 8A). For example, if the target voltage gain (AV) was AV≧60 dB, then the corner can be anywhere on the AV=60 dB contour 140. A good choice of corner is the most-probable corner 141 on the AV=60 dB contour, which is the corner (process point) that is the one closest to mean=0. A yield-driven corner chooses a target specification value (target performance metric) according to the target yield value, such as shown in FIG. 8B, wherein one-, two-, and three-sigma contours are shown at 145, the three-sigma contour being the outermost ring, the one-sigma contour being the innermost ring, and the two-sigma contour being the intermediary ring. The yield-driven approach ignores the target performance metrics. For illustration, let us assume target yield is 99.7% on one output AV (three-sigma contour). Then, the target specification value is AV at the $99.7^{th}$ percentile of its observed distribution; for the example this is a value of 55 dB. Then, the extracted corner is the most probable process point giving the target specification value. With more than one performance metric, the performance metric values are chosen such that the overall yield is 99.7%.

Figure 9:
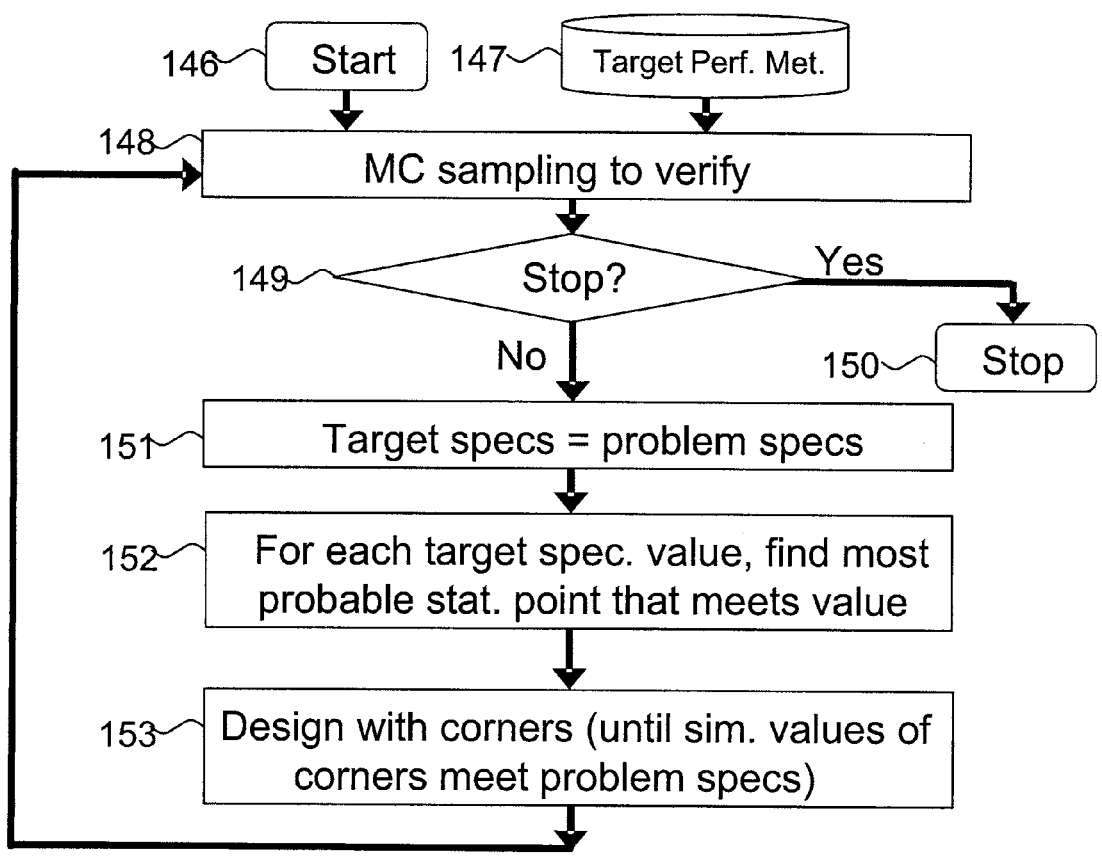
FIG. 9 shows a flowchart of another embodiment of a method of the present disclosure.

FIG. 9 shows another exemplary flow of the present disclosure and relates to a method to set the design values of an ECD that has an initial design point. The design point can be varied in order for the electrical circuit to meet certain targets. The flow of FIG. 9 can be referred to as a "Statistical Monte-Carlo-Spec-Driven" flow. The flow of FIG. 9 starts at 146 and uses pre-specified (pre-determined) target performance metric values 147 as input. At 148, Monte-Carlo sampling of the process variables space is performed to obtain process points and, for each of the process points, the ECD is simulated on all the environmental points. Based on the simulation, it is determined, at 149, if the ECD satisfies the overall target performance metrics (overall stop criteria) and, possibly an overall target yield. If the ECD does meet those criteria, the flow stops at 150. If not, the flow goes to 151.

Action 151 sets the pre-specified target performance metric values 147 as the target specs (i.e., as the corner performance-based stop criteria). For each target spec (specification), action 152 finds the most probable process point that meets the respective target spec, using the Monte-Carlo data obtained at action 148, and, possibly more simulations. Action 152 can be implemented in any suitable way. For example, one way is to perform, for each target performance metrics, a one-dimensional line search on a line defined by (a) the nominal process point and (b) the Monte-Carlo-sampled process point that gives a value closest to the target performance metrics (at the environmental point causing the worst performance at that process point). The one-dimensional line search obtains feedback from circuit simulation. The one-dimensional line search concludes when the search point has a simulated output value that is sufficiently close to the target spec. Another way to perform action 152 is, for each target spec, to identify the Monte-Carlo-sampled process point that has a performance metric value closest to its respective target spec, as well as the environmental point causing that process point's worst performance; and then to perturb and simulate each process and environmental variable about that process point and environmental point. Subsequently, a linear model is constructed around that process point and environmental point using the perturbation data and, finally, each linear model (one model per target performance metric) is used to find the most-probable process point that returns the target spec. For each target spec, the extracted corner is this most-probable process point, along with the environmental point that causes worst-case performance. At action 153, design of the electrical circuit is performed using the extracted corners, getting feedback from circuit simulation. Actions 148-153 repeat until a stopping condition of 149 is met; for example the yield of the design is satisfactory, or the designer has used his scheduled time so he picks the best design and moves on.

Aspects of the flow of FIG. 9 can be described in the context of the flow of FIG. 7. For example, with reference to FIG. 7, the pre-determined overall stop criteria at 1004 can be the target performance metric values and, determining the set of corner points at 1006 can include determining, for each performance metric, a process point from the initial process points at which a calculated performance metric value is closest to its respective target spec. In this case, the corner performance-base stop criteria is the target performance metric values. Further, the set of corner points can be determined by performing, for each target spec, a one-dimensional line search on a line that includes a nominal process point and the process point with performance metric value closest to the respective target spec. The one-dimensional line search is conducted to obtain a process point at which the performance metric value is nearer to the target spec than the process point at which the performance metric value is closest to the target spec. Performing the one-dimensional line search can include simulating the ECD at process points comprised on the line to obtain line search simulation data. The line search simulation data can be used to calculate performance metric values for the sample points comprised on the line.

Alternatively, the set of corner points at 1006 can be extracted (determined) by performing, for each performance metric, a perturbation of the process and environmental point having a performance metric value closest to the respective target spec to obtain perturbation points. Subsequent the perturbation points having been obtained, the ECD can be simulated at the perturbation points to obtain perturbation simulation data. Based on the perturbation data (in accordance with the perturbation data, as a function of the perturbation data), a performance metric value for each perturbation point (a perturbation performance metric) can be calculated to obtain performance metric data, which can be used to obtain (determine) a linear model of the performance metric. Subsequent these actions, it is possible to determine, for each performance metric, in accordance with the linear model of the performance metric, a process point at which the performance metric having performance metric value that is nearer to the target spec than the process point having the performance metric that is closest to the target spec. In this case also, the corner performance-base stop criteria is the target performance metric values.

Figure 10:
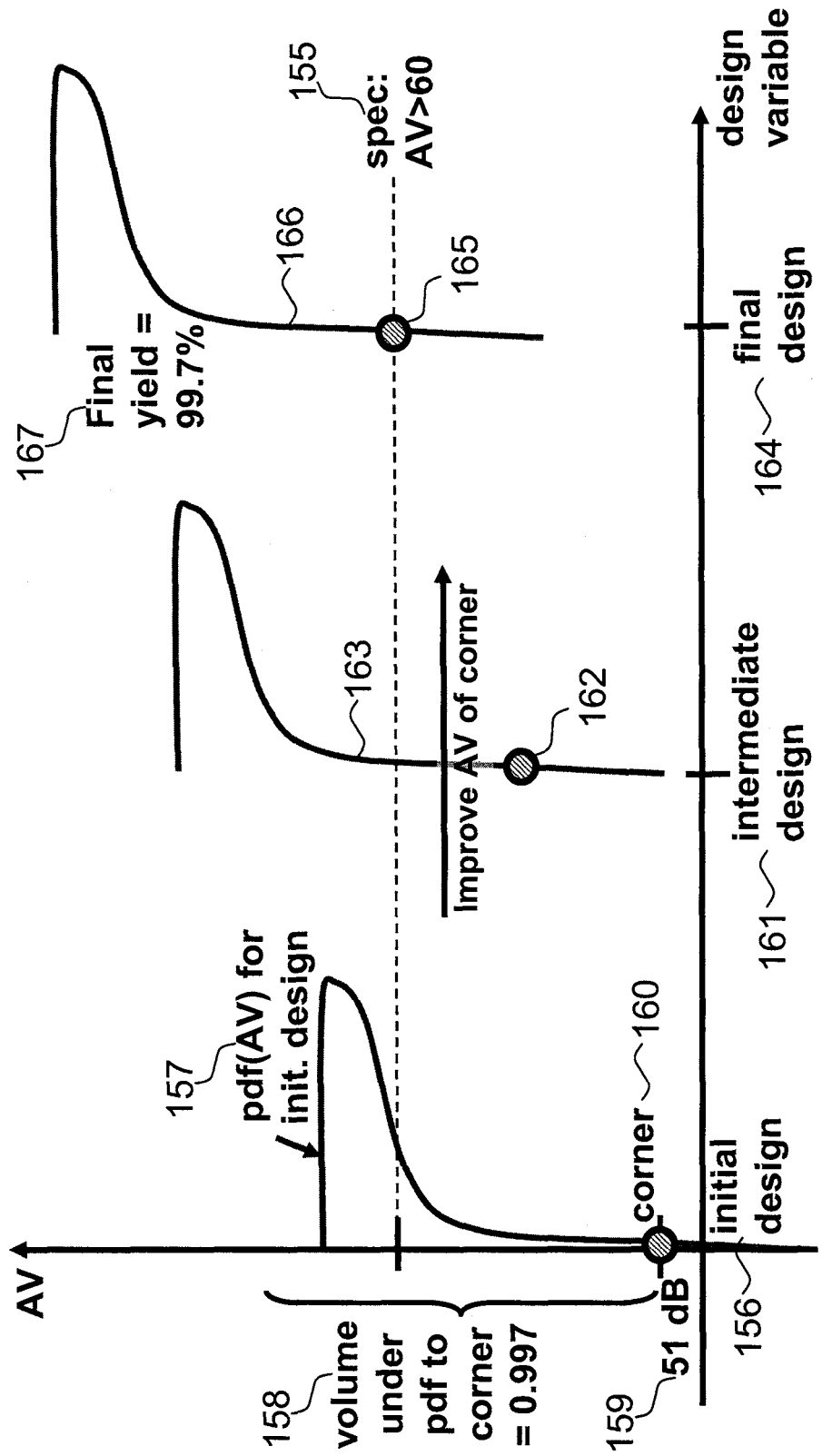
FIG. 10 shows plot of design improvement in accordance with an exemplary method of the present disclosure.

The pre-determined criteria (overall stop criteria) to which action 1004 of FIG. 7 refers can be, or can include, a target overall yield. Specific examples of yield-driven extraction of corners are provided below. However, prior to describing those examples, reference is made to FIG. 10, which shows conceptually how a yield-driven approach affects the design of an electrical circuit. The general idea is that each corner represents the lower or upper percentile bound of a probability distribution function (pdf) and, via design changes to improve simulated performance on the corner, the pdf will implicitly improve. In FIG. 10, the abscissa represents a design variable and the ordinate represents the AV performance metric, which has a specification 155 of AV>60 dB. The initial design 156 has a pdf for AV 157. The $99.7^{th}$ (three-sigma) lower bound percentile of the pdf is at a value 159 of AV=51 dB. A corner 160 (which is a point in process variables space) is found that gives this value of AV=51 dB. Subsequently, the ECD is improved 161 in an intermediate design, by getting feedback on the ECD by simulating on the corner 162. Implicitly, the pdf 163 will improve too, but this cannot be directly observed (unless extra, computationally-intensive simulations are done). During all design iterations, the yield can be assumed to be 99.7% because the corner represents the lower bound. This allows for performance tradeoff exploration when there are more than one target performance metrics. The design can be continually improved; one stopping criteria may be when the corner output meets the specification 165.

Figure 11:
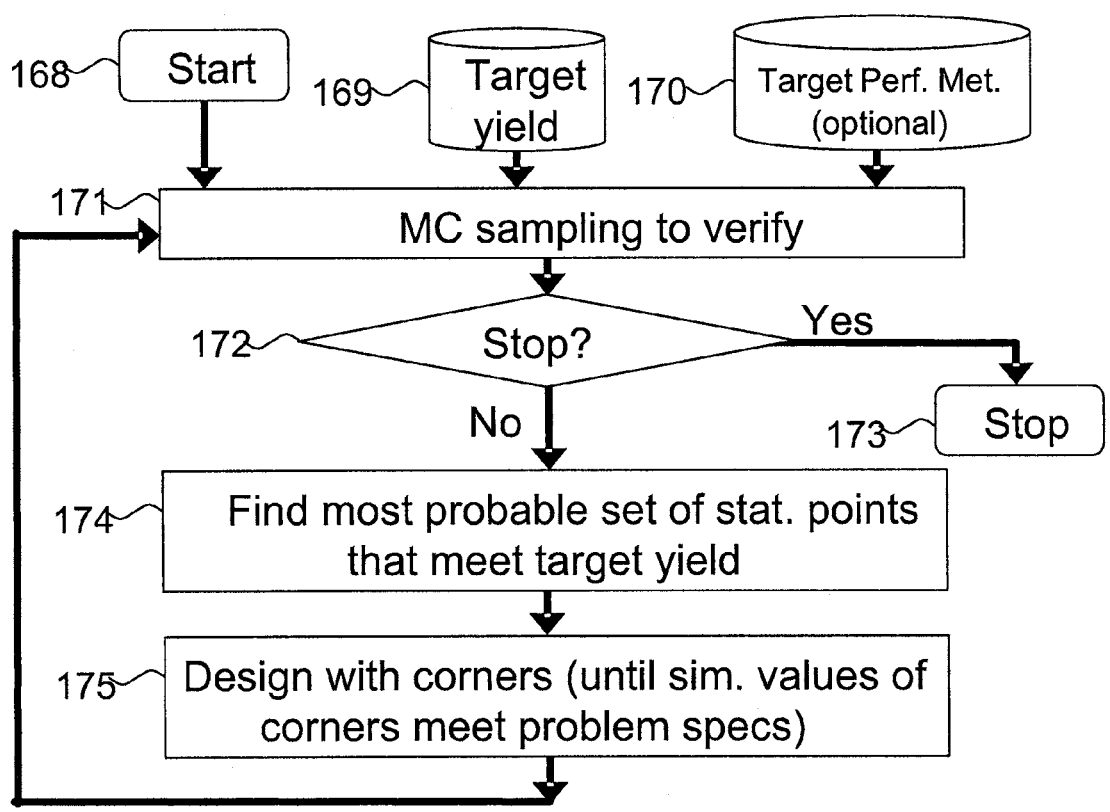
FIG. 11 shows a flowchart of another embodiment of a method of the present disclosure.

FIG. 11 shows a flowchart of another exemplary method of the present disclosure. The flow of FIG. 11 can be referred to as a "Statistical Monte-Carlo-Yield-Driven-one-action" flow, and requires as input a target overall yield 169, which, in this example, can be referred to as the overall stop criteria. The flow starts at 168. Monte-Carlo sampling of the process variables space is performed at 171 to obtain process points, and an ECD that has an initial design point is simulated at all environmental points for each of the process points. Based on the simulation, it is determined, at 172, if the pre-determined overall stop criteria is met (the ECD satisfies the target overall yield 169). If the ECD does meet this criteria, the flow stops at 173. If not, the flow goes to 174.

Action 174 finds the most probable process points that meet the target yield 169, by using Monte-Carlo data obtained at action 171, and possibly more circuit simulations. Action 174 can have many possible embodiments. One embodiment is as follows: (a) assign one corner for each performance specification (e.g., one for lower bound AV, one for upper bound power, and two for lower/upper bounds of power supply rejection ratio (PSRR)); then (b) solve the optimization problem that searches across a set of candidate process points, maximizes the combined probability densities of the candidate process points (e.g. product of process points' individual probability densities), and is subject to overall yield meeting the target overall yield. The overall yield can be calculated as follows: from each process point, simulate or estimate the performance metrics values that the point gives; use these values as the target specs; then, using the initial Monte-Carlo data obtained at 171, calculate the overall yield using these specs as specification values to determine what process points are feasible. At action 175, design is performed using the extracted corners obtained at 174, getting feedback from circuit simulation. Actions 171-175 repeat until a stopping condition of 172 is met; for example the overall yield is satisfactory.

Aspects of the flow of FIG. 11 can be described in the context of the flow of FIG. 7. For example, with reference to FIG. 7, the pre-determined overall stop criteria at 1004 can be the target overall yield. Further, each process point can have a probability density associated thereto and, determining the set of corner points at action 1006 can include searching the process variables space to identify a pre-determined number of process points to obtain identified process points, the identified process points being subject to a yield (overall yield) that is equal to, or greater than, the target ECD yield. That is, each identified process point corresponds to a performance specification, and the points' overall yield is measured from those performance specifications. Additionally, the identified process points are subject to a product of the probability density of each identified process point being greater than a product of a probability density of process points in other groups of process points, the other groups having a number of process points equal to that of the pre-determined number of process points, the other groups having associated thereto an overall yield that is also equal to, or greater than, the target ECD yield. In the present example, the corner performance-based stop criteria may include target ECD performance metric values The yield of a group of identified process points can be calculated in accordance with the performance metric value of each identified process point and in accordance with the performance metric values from the initial set of process points. That is, once the performance metric value of an identified process point is calculated, the percentage of points from the initial set of process points that meet (or exceed) the performance metric values of the identified process point can be calculated to obtain the yield of the group of identified process points.

Figure 12:
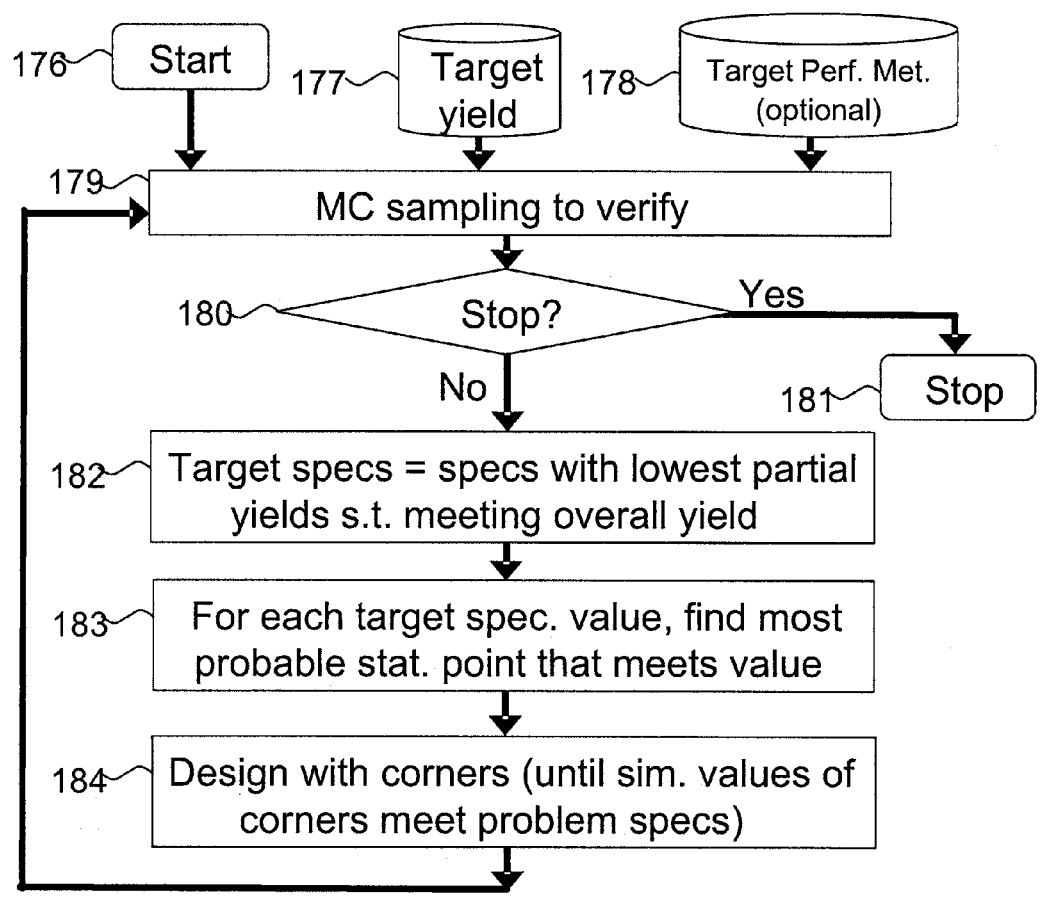
FIG. 12 shows a flowchart of another embodiment of a method of the present disclosure.

FIG. 12 shows a flowchart of another exemplary method of the present disclosure and relates to a method to set the design variables of an ECD that has an initial design point. The flow of FIG. 12 can be referred to as a Statistical Monte-Carlo Yield-Driven two-action flow. The flow starts at 176 and uses the problem's target overall yield 177 (ECD target yield) as input. Monte-Carlo sampling of the process variables space is performed at 179 to obtain process points and the ECD is simulated at all of the environmental points for each of the process points. Based on the simulation, it is determined, at 180, if the ECD satisfies the pre-specified stopping criteria, also referred to as overall stop criteria, (such as the target overall yield 177, or if the target performance metrics 178 are satisfactory for the yield measured). If the ECD does meet this overall stop criteria, the flow stops at 181.

Whereas the Statistical Monte-Carlo Yield-Driven-one-action flow of FIG. 11 extracts corners in one single action 175 with one single optimization problem, the flow of FIG. 12 breaks the corner-extraction problem into two sequential actions 182 and 183 to reduce computational effort. Generally, action 182 finds target specs (e.g., one target specification per performance specification of the ECD), and action 183 finds a corner corresponding to each target specification. Note that there is no relation between the target performance metrics 178 and the target specs 182; the target performance metrics 178 are used only when considering when to stop at 180. Specifically, action 182 solves an optimization problem that searches across a vector of candidate target spec values, minimizing the combined partial yields (e.g. sum of partial yields of each output, where each partial yield is determined by its associated candidate target spec value), subject to overall yield of the corners meeting the target yield specified at 177. Action 182 uses the existing Monte-Carlo simulation data (obtained at 179) to estimate partial yields and overall yield. Subsequently, action 183 solves one optimization problem for each target spec value. That is, action 183 searches across the space of possible process points, minimizing the probability density of the point, subject to the simulated performance metric value meeting its respective target spec value (which was established at 182). The search across the space of possible process points can be conducted with any suitable algorithm including, for example, evolutionary search algorithms. At action 184, design of the ECD is performed using the extracted corners, getting feedback from circuit simulation. Actions 179-184 repeat until a stopping condition (overall stop criteria) of 180 is met; for example the overall yield is satisfactory. In the present example, the corner performance-based stop criteria may include the target performance metric values.

Figure 13A:
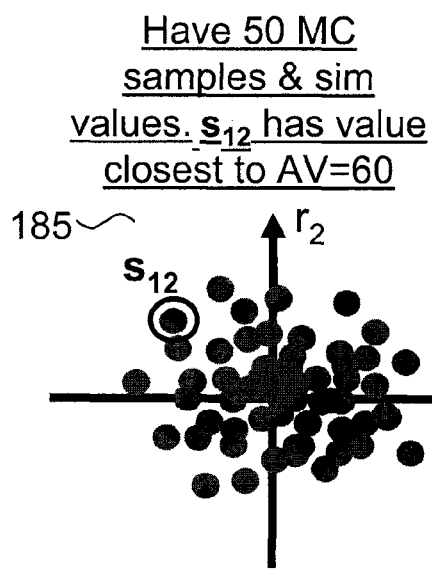
FIGS. 13A and 13B show plots illustrating a specific actions in an the third exemplary method of the present disclosure.
Figure 13B:
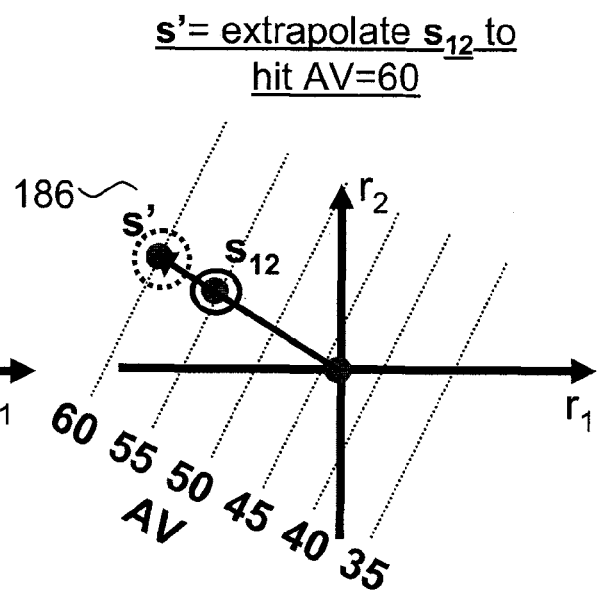

FIGS. 13A and 13B illustrate a possible embodiment of action 183 from FIG. 12, on the example of an output AV with target specification value AV=60 dB. At 185 in FIG. 13A, the existing simulated Monte-Carlo sample points $\{s_1, s_2, \ldots, s_{50}\}$ are examined, and the point $s_{12}$ is selected as its associated AV value is closest to AV=60 dB. Then, at 186 in FIG. 13B, a one-dimensional line search (in this case extrapolation) is performed on the line defined by the nominal process point and the picked sample point $s_{12}$. Circuit simulation is used as feedback within the one-dimensional line search. The search continues until a maximum number of simulations is exceeded, or the best search candidate has an output value sufficiently close to AV=60 dB. The search returns the final point s' (FIG. 13B) which will be used as a corner.

Aspects of the flow of FIG. 12 can be described in the context of the flow of FIG. 7. For example, with reference to FIG. 7, the pre-determined overall stop criteria at 1004 can be the target ECD overall yield. Further, determining the set of corner points at 1006 can include identifying a target spec for each performance metric to obtain a set of identified target specs. The set of target specs has an overall yield equal to, or greater than, the target ECD overall yield. Each identified target spec has associated thereto a partial yield. A sum of the partial yields is less than a sum of partial yields of other sets of target specs that have an overall yield that is also equal to, or greater than, the target ECD overall yield. Further, for each target spec of the set of identified target specs, in order to obtain a corner of the set of corner points, determination is made of a point in the process variables space that has the highest probability density subject to having a calculated performance spec that is within a pre-determined range of its respective performance specification. As such, the corner performance-based stop criteria may include the target performance metric values.

Determining the point in the process variables space can include performing a one-dimensional line search on a line that includes a nominal process point and the process point that has the highest probability density. In this case, the one-dimensional line search is to obtain a process point at which the performance metric value is nearer to the target performance metric value than the process point with the highest probability density.

Figure 14:
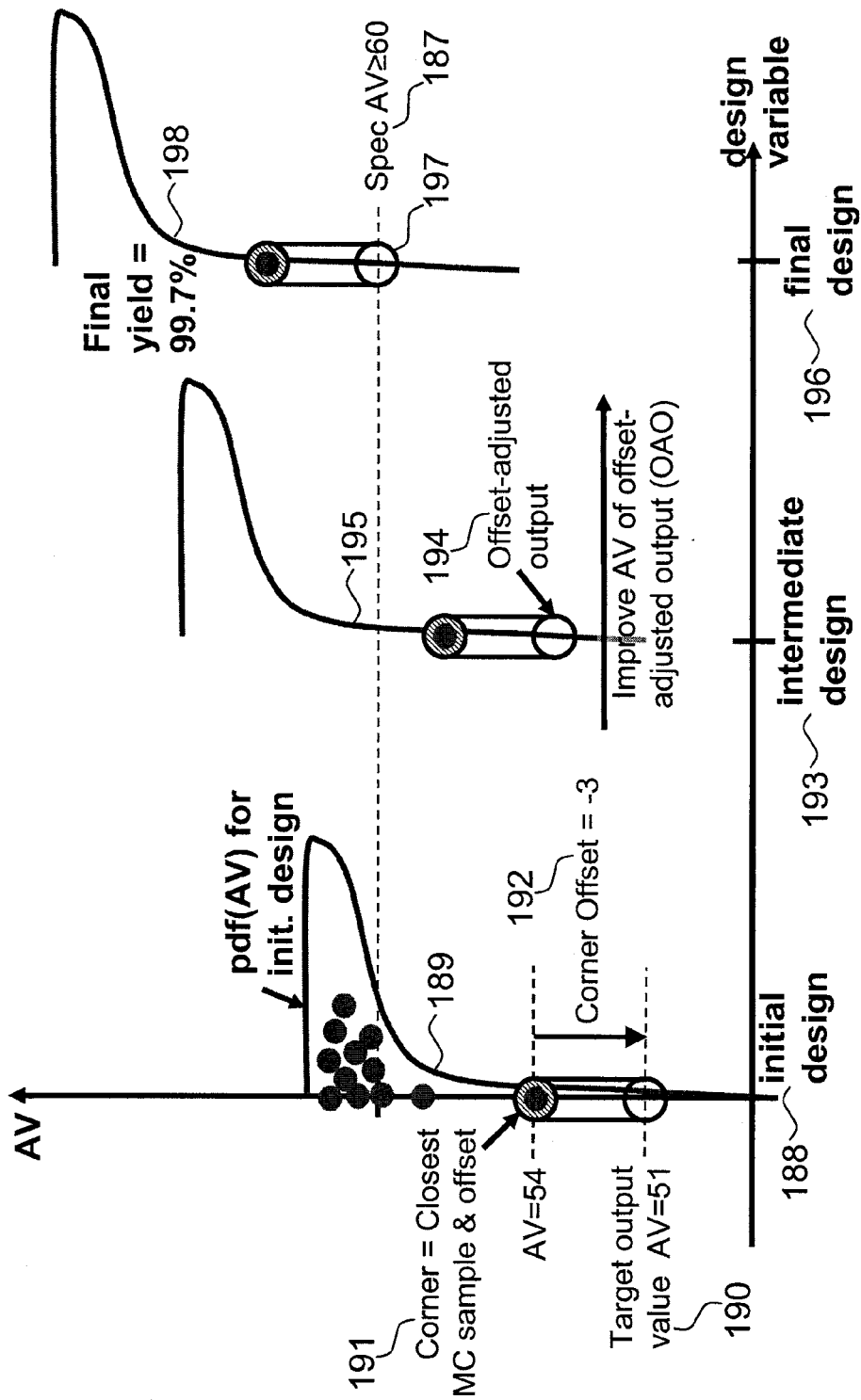
FIG. 14 shows plots of design improvement in accordance with another exemplary method of the present disclosure.

An additional exemplary yield-driven method that uses less computational efforts than other methods, at the expense of corners that take slightly more effort to manage, is presented further below. Before we describe that method, we first show the main idea, which involves "offset-adjusted outputs" (OAOs). FIG. 14 illustrates. The general idea is that each corner represents the lower or upper percentile bound of the distribution, but only captures the bound's exact value through an offset. Design changes are made to improve the offset-adjusted output value, which will implicitly improve the distribution. In the example of FIG. 14, the abscissa is the design variable, and the ordinate is an output AV having a specification 187 of AV>60 dB. The initial design 188 has a probability distribution function (pdf) for AV 189. The 99.7$^{th}$ lower bound percentile of the pdf is at a value 190 of AV=51 dB. In this example, the Monte-Carlo sample with the closest output value to AV=60 dB is one with AV=54 dB. Therefore the offset is 51 dB–54 dB=–3 dB. In other approaches, a corner can be defined by environmental and process variable values; in the present approach, the corner 191 is also defined by the offset value of –3 dB. Once the initial Monte-Carlo simulations are done, no computational effort is needed to find this corner. Subsequently, the design is improved at 193 by getting feedback on the design by simulating on the corner and computing its offset-adjusted output (OAO) 194. Implicitly, the pdf 195 will improve too, but this cannot be directly observed (unless extra, computationally-intensive simulations are done. The design can be continually improved; one stopping criteria may be when the corner offset-adjusted output meets the specification 197.

Figure 15:
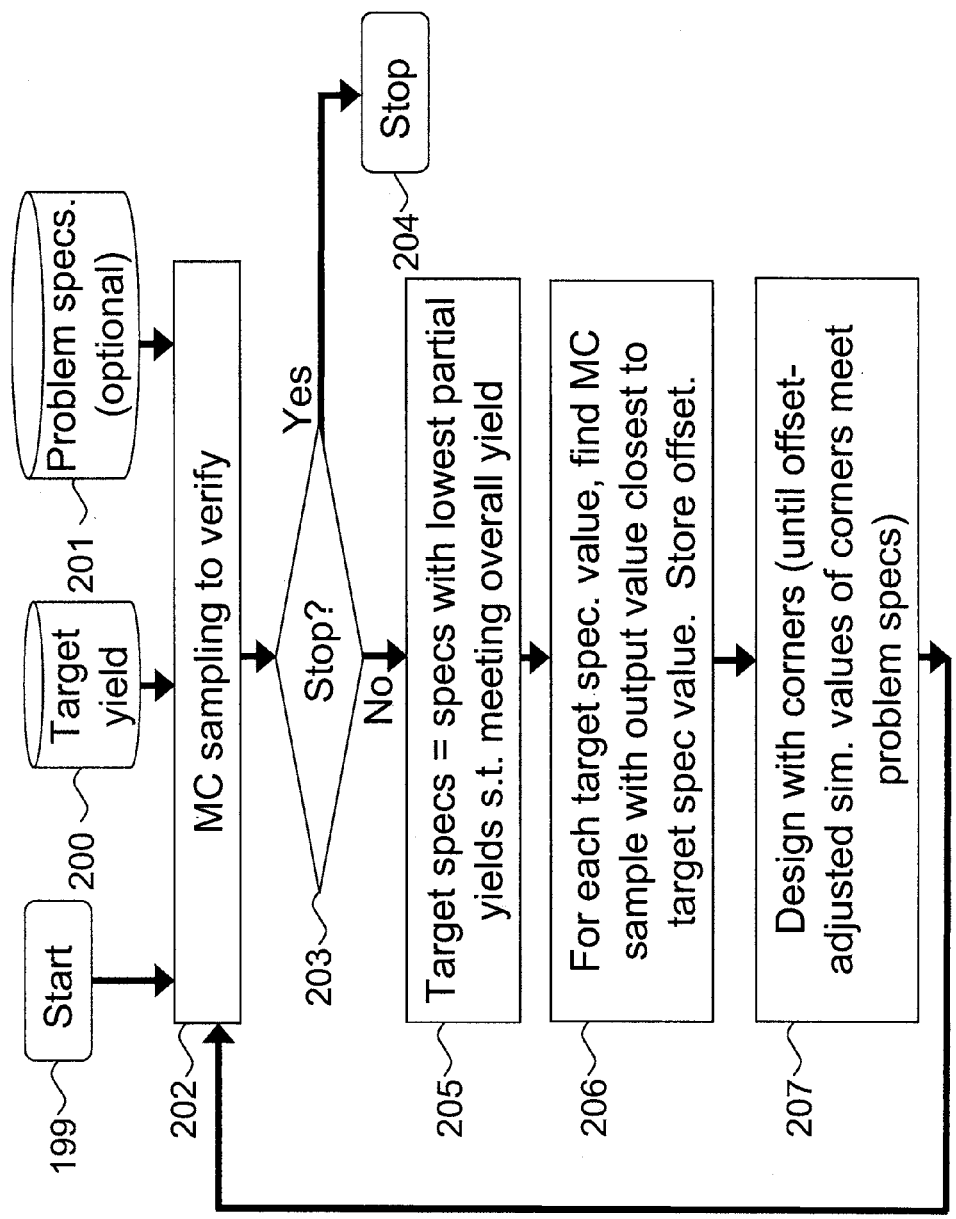
FIG. 15 shows a flowchart of another embodiment of a method of the present disclosure.

FIG. 15 shows a flowchart of another exemplary method of the present disclosure. The flow of FIG. 15 can be referred to as a Statistical Monte-Carlo, Yield-Driven, OAO flow. It is similar to the flow of FIG. 12, except it has a different approach to extracting corners given target specs, replacing action 183 in FIG. 12 with action 206 in FIG. 15. In action 206, the flow simply finds the Monte-Carlo sampled process point that has an output performance value closest to the target performance spec, and stores as a corner the value of the MC process point along with the offset, which is equal to target value minus simulated value. Then the corner-based design in action 207 is slightly different in that the design is performed using the offset-adjusted simulation values as feedback, rather than the values directly from simulation. The corner performance-based criteria includes setting the corner performance-based stop criteria to include the offset-adjusted target performance specs.

Figure 16:
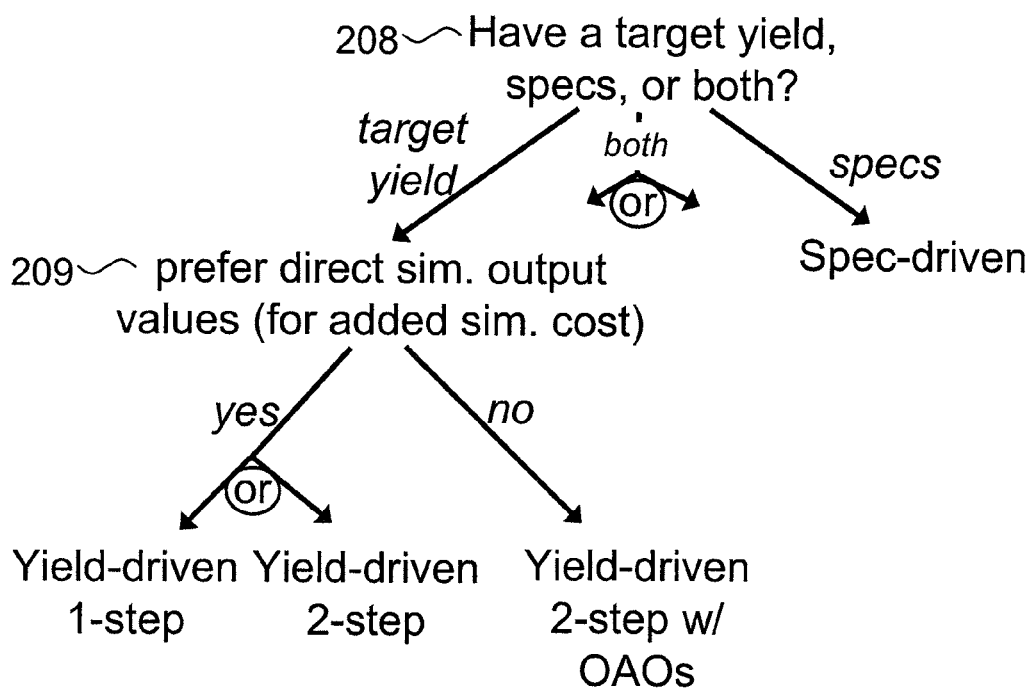
FIG. 16 shows decision tree that can by used for guidance in selection a particular embodiment of a method of the present disclosure.

The present disclosure can be embodied into several possible flows, such as those shown in FIG. 6, FIG. 7, FIG. 9 (Statistical Monte-Carlo-spec-driven), FIG. 11 (Statistical Monte-Carlo-yield-driven-one-action), FIG. 12 (Statistical Monte-Carlo-yield-driven-two-action), FIG. 15 (Statistical Monte-Carlo-yield-driven-OAO), and FIG. 16. FIG. 17 shows an example of decision tree giving some guidance on where each "Statistical MC" embodiment may be used.

With respect to FIG. 16, the first question 208 is whether the problem (the electrical circuit design problem) has a defined target yield, defined target performance metrics, or both. If the problem has just specifications, then the Statistical Monte-Carlo-spec-driven approach (or similar embodiments) is most appropriate; the objective will be to maximize yield subject to the specifications. If the problem has just target yield, this implies that specifications can be traded off; a "yield-driven" approach is the most appropriate. If the problem has both target yield and specifications, then any approach will work, and the overall objective will be to maximize margin subject to meeting the problem's target yield and output specifications. (Margin is the degree to which the design exceeds target yield, output specifications, or design-space distance from the design to the nearest design regions failing yield or specifications.) Given the choice of a "yield-driven" approach, the second question 209 is whether the designer prefers (a) to see direct simulated values of corners, at the cost of more simulation, or (b) offset-adjusted simulation values, for less simulation. If the designer prefers (a), then an embodiment like "Statistical MC-yield-driven-taction or "Statistical MC-yield-driven-2action" is appropriate. Otherwise, for choice (b) an embodiment like "Statistical-MC-yield-driven-OAO" is appropriate.

In the preceding description, for purposes of explanation, numerous other details are set forth in order to provide a thorough understanding of the embodiments of the disclosure. However, it will be apparent to one skilled in the art that these specific details are not required in order to practice the teachings of the present disclosure. In other instances, well-known electrical structures and circuits are shown in block diagram form in order not to obscure the disclosure. Specific details are not provided as to whether the embodiments of the disclosure described herein are implemented as a software routine, hardware circuit, firmware, or a combination thereof. Also, there was less emphasis on finding values for environmental variables versus process variables; however, it will be apparent to one skilled in the art that there are straightforward approaches to deal with environmental variables. For example, the designer could pre-set a group of environmental points that are simulated on every process point, and only the worst-case performance across all environmental points is reported as the "simulated value". As another example, MC simulation could be performed on all pre-set environmental points, then for each problem specification, the environmental point causing worst-case performance is used.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform actions in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A tangible, non-transitory computer-readable medium containing instructions, which when executed by a processor cause the processor to perform a method to size an electrical circuit design (ECD), the ECD having associated thereto design variables, process variables and environmental variables, the process variables defining a process variables space that has a distribution of process points, and the environmental variables defining an environmental variables space defined by environmental points, the ECD having associated thereto a design point defined by a set of design variable values, the ECD further having associated thereto a plurality of performance metrics, the method comprising:
   A) iteratively performing actions a-d until a pre-determined overall stop criteria has been attained:
      a) drawing an initial set of process points from the distribution of process points;
      b) for each process point, automatically simulating the ECD, at the design point, and on all the environmental points, to obtain simulation performance data;
      c) determining, in accordance with the performance data, if the pre-determined overall stop criteria has been attained;
      d) responsive to the overall stop criteria having not been attained, iteratively performing the following actions i-v until a corner performance-based stop criteria has been attained:
         i) in accordance with the initial set of process points, the environmental points, and the performance data, determining a set of corner points, each corner point having a process point and environmental point;
         ii) defining the corner performance-based criteria in accordance with at least one of the overall stop criteria and the set of corner points;
         iii) varying at least one design variable value to modify the design point;
         iv) simulating the design point at the corner points, to obtain additional simulation performance data; and
         v) determining, in accordance with the additional simulation performance data, if the corner performance-based stop criteria has been attained; and,
   B) storing the design point in a tangible, non-transitory computer readable medium.

2. The computer-readable medium of claim 1 wherein drawing the initial set of process points from the distribution of process points includes drawing points using pseudo-random sampling.

3. The computer-readable medium of claim 1 wherein drawing the initial set of process points from the distribution of process points includes drawing points using low-discrepancy sampling.

4. The computer-readable medium of claim 1 wherein the overall stop criteria includes target performance metric values.

5. The computer-readable medium of claim 4 wherein:
   determining the set of corner points includes determining, for each target performance metric value, a process point from the initial set of process points at which a worst-case performance metric value of the process point is closest to its respective target performance metric value, the worst-case performance metric value being determined subsequent a simulation of all environmental points at the process point; and
   defining the corner performance-based stop criteria includes setting the corner performance-based stop criteria to include the target performance metric values.

6. The computer-readable medium of claim 5 wherein determining the set of corner points further includes performing, for each performance metric, a one-dimensional line search on a line that includes a nominal process point and the process point having the worst-case performance metric value that is closest to the respective target performance metric value, the one-dimensional line search to obtain a process point at which the worst-case metric value is nearer to the target performance metric value than the process point at which the worst-case metric value is closest to the target performance metric value.

7. The computer-readable medium of claim 6 wherein performing the one-dimensional line search includes simulating the ECD at process points comprised on the line to obtain line search simulation data, the line search simulation data to calculate worst-case performance metric values for the sample points comprised on the line.

8. The computer-readable medium of claim 5 wherein determining the set of corner points further includes, for each performance metric:
   performing a perturbation of the process point having the worst-case performance metric value that is closest to the respective target performance metric value, and of the environmental point associated with the worst-case performance metric value, to obtain perturbation points;
   simulating the ECD at the perturbation points to obtain perturbation simulation data;
   calculating, in accordance with the perturbation simulation data, a perturbation performance metric value for each perturbation point to obtain perturbation performance metric data;
   determining, in accordance with the perturbation performance metric data, a linear model of the performance metric; and
   determining, in accordance with the linear model of the performance metric, a process point at which the worst-case performance metric value is nearer to the target performance metric value than the process point at which the worst-case performance metric value is closest to the target performance metric.

9. The computer-readable medium of claim 1 wherein the pre-determined overall stop criteria includes a target ECD yield.

10. The computer-readable medium of claim 9 wherein:
   determining the set of corner points includes:
      selecting process points from the process variables space to obtain selected process points, each selected process point having a probability density associated thereto;
      forming groups of selected process points;
      calculating an overall yield for each group;
      calculating, for each group, a product of the probability densities of the process points; and selecting, as the set of corner points, the group having an overall yield that is equal to, or greater than, the target ECD yield and that has the highest product of probability densities; and defining the corner performance-based criteria includes setting the corner performance-based stop criteria to include target performance metric values.

11. The computer-readable medium of claim 10 wherein the overall yield of each group is calculated in accordance with performance metric values of each point in the group and in accordance with performance metric values of process points of the initial set of process points.

12. The computer-readable medium of claim 11 wherein a calculation of an overall yield of each group includes:
for each performance metric of each process point in the group, estimating or simulating the performance metric value;
determining, in accordance with the estimated or simulated performance values, a proportion of the initial set of process points that are feasible.

13. The computer-readable medium of claim 9 wherein determining the set of corner points includes:
forming groups of target performance specifications, each group having one target specification for each performance metric associated with the ECD;
calculating, in accordance with the initial set of process points, an overall yield for each group;
calculating, for each of the target performance specification of each group, a partial yield of each target performance specification;
calculating, for each group, a sum of the partial yields of each target performance specification;
identifying a group that has a lowest sum of partial yields and an overall yield that is equal to, or greater than, the target ECD yield; and
for each target specification of the identified group, selecting, from the process variables space, a process point that has a highest probability density subject to having a performance metric value within a pre-determined range of its respective target specification; and defining the corner performance-based criteria includes setting the corner performance-based stop criteria to include target performance metric values.

14. The computer-readable medium of claim 13 wherein selecting, from the process variables space, the process point that has a highest probability density, includes performing a one-dimensional line search on a line that includes a nominal process point and the process point that has a highest probability density, the one-dimensional line search to obtain a process point having a performance metric value nearer to the target specification than the process point with the highest probability density.

15. The computer-readable medium of claim 9 wherein determining the set of corner points includes:
forming groups of target performance specifications, each group having one target specification for each performance metric associated with the ECD;
calculating, in accordance with the initial set of process points, an overall yield for each group;
calculating, for each of the target performance specification of each group, a partial yield of each target performance specification;
calculating, for each group, a sum of the partial yields of each target performance specification;
identifying a group that has a lowest sum of partial yields and an overall yield that is equal to, or greater than, the target ECD yield;
for each target specification of the identified group:
selecting, from the process variables space, a process point that has a performance metric value closest to its respective target performance specification; and
calculating an offset between a performance metric value of the process point and the respective target performance specification to obtain an offset-adjusted target performance specification;
and
defining the corner performance-based criteria includes setting the corner performance-based stop criteria to include the offset-adjusted target performance metric values.

* * * * *